United States Patent
Lee et al.

(10) Patent No.: US 9,460,090 B2
(45) Date of Patent: Oct. 4, 2016

(54) METHOD OF RECOGNIZING SITUATION REQUIRING TRANSLATION AND PERFORMING TRANSLATION FUNCTION, AND ELECTRONIC DEVICE IMPLEMENTING THE SAME

(71) Applicant: Samsung Electronics Co., Ltd., Gyeonggi-do (KR)

(72) Inventors: Jinwoo Lee, Seoul (KR); Chanwoo Park, Gyeonggi-do (KR); Byungsoo Kim, Gyeonggi-do (KR); Jiyeon Seo, Seoul (KR); Myunghwan Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 13 days.

(21) Appl. No.: 14/448,297

(22) Filed: Jul. 31, 2014

(65) Prior Publication Data
US 2015/0142416 A1    May 21, 2015

(30) Foreign Application Priority Data
Nov. 15, 2013  (KR) .......................... 10-2013-0138783

(51) Int. Cl.
*G06F 17/28* (2006.01)

(52) U.S. Cl.
CPC .................................. *G06F 17/289* (2013.01)

(58) Field of Classification Search
None
See application file for complete search history.

(56) References Cited

U.S. PATENT DOCUMENTS

| | | | |
|---|---|---|---|
| 8,848,109 B2 * | 9/2014 | Pornprasitsakul .... | G06F 3/0484 348/468 |
| 2002/0040292 A1 * | 4/2002 | Marcu ................... | G06F 17/271 704/4 |
| 2012/0130704 A1 | 5/2012 | Lee et al. | |
| 2013/0289971 A1 * | 10/2013 | Parkinson ............... | G10L 15/26 704/2 |
| 2013/0297285 A1 * | 11/2013 | Kwon ................. | G06F 17/2863 704/2 |

* cited by examiner

*Primary Examiner* — Qian Yang
(74) *Attorney, Agent, or Firm* — Cha & Reiter, LLC

(57) ABSTRACT

Disclosed are a method of recognizing a translation situation and performing a translation function, and an electronic device implementing the same. The electronic device recognizes a situation involving translation and automatically performs a translation function, thereby improving user convenience. An electronic device includes an audio module configured to receive and output audio signal, and a processor. A language translation program is executed in response to detecting that an audio signal received through the audio module includes at least a first language and a second language, a portion of the audio signal that is in the second language is translated into the first language, and the translated portion is outputted through the audio module.

19 Claims, 14 Drawing Sheets

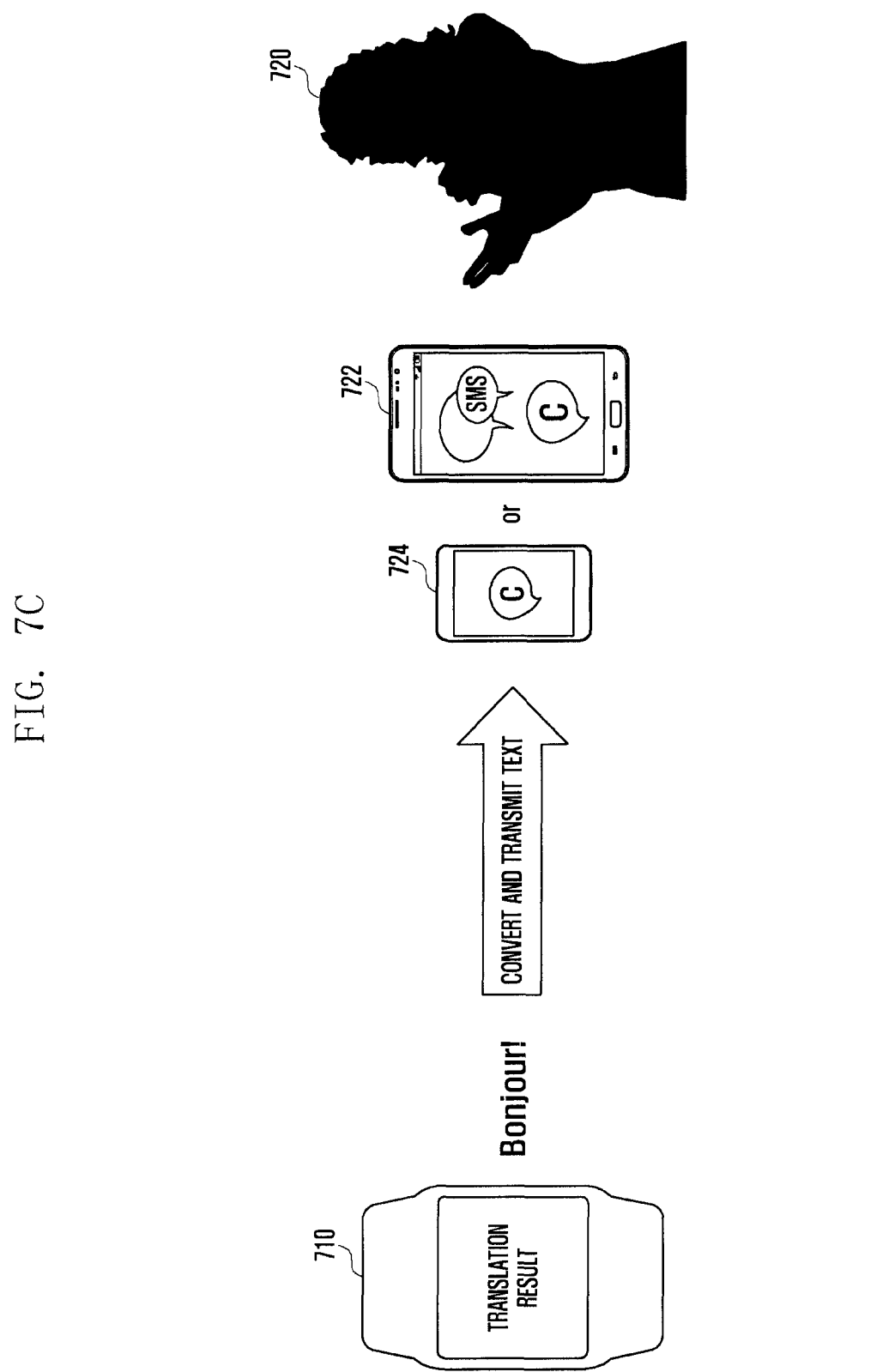

though the electronic device may pre-define a sensor reference value for a specific movement, compare a current sensor value of the electronic device and a reference value, and determine whether the electronic device meets a specific movement condition.

METHOD OF RECOGNIZING SITUATION REQUIRING TRANSLATION AND PERFORMING TRANSLATION FUNCTION, AND ELECTRONIC DEVICE IMPLEMENTING THE SAME

CROSS-REFERENCE TO RELATED APPLICATION

This application claims priority from and the benefit under 35 U.S.C. §119(a) of Korean Patent Application No. 10-2013-0138783, filed on Nov. 15, 2013, which is hereby incorporated by reference for all purposes as if fully set forth herein.

TECHNICAL FIELD

The present disclosure relates to a method of recognizing a situation involving translation and performing a translation function, and an electronic device implementing the same.

BACKGROUND

Because of the rapid advancement electronic devices, people use various electronic devices in their daily life. Particularly, electronic devices are now able to recognize movements or motions of users and automatically perform a specific function. Further, the electronic devices may response to commands generated via voice input, as well as motion input. As described above, technicians develop the electronic devices in order to make human's life more convenient and comfortable in various contexts. For example, a user may utilize an electronic device as a translation tool in order to communicate with a foreigner. This is helpful as people frequently communicate with foreigners due to the advent of globalization. Recent electronic devices may thus include a function for translation. Language translation functions using the electronic device may be generally performed by a direct input movement of a user. For example, the electronic device may perform a translation function by in response to physically receiving a click selection of a language translation button of the electronic device. This physical-input based driving method may be substituted with a new driving method according to a developed function of the electronic device.

According to the rapid development of a technique, electronic devices may recognize language and perform an operation for the corresponding language. Further, the developed function of the electronic devices may increase the kind of language detectable by the electronic devices and further improve accuracy of the detection. Further, the electronic devices may have various sensors. Accordingly, in a case where a user makes a specific movement, the electronic devices may perform a predetermined specific function based on the specific movement. For example, the specific function may be a turn over function of a smart terminal. That is, the specific function may be a scheme of executing the corresponding function when it is recognized that a screen is pointed down for a predetermined time or longer after a condition that the screen of the smart terminal is pointed up for a predetermined time or longer is satisfied. As described above, the electronic device may detect a movement of the electronic device by comparing a current sensor value based on a previously defined sensor value. That is, the electronic device may measure sensor values by using various embedded sensors and perform a specific function according to a corresponding sensor value. Here,

SUMMARY

A conventional electronic device requires a physical input operation in order to perform a function for translating a language. Accordingly, a user may perform a physical operation (for example, a click of a translation button and the like) and use a translation function whenever translating a language. A user may be inconvenienced and a considerable time may be wasted during the translation. The present disclosure enables an electronic device to provide contextual translation functionality by using various sensors and an audio codec.

For example, when the electronic device recognizes voice data via a microphone and a speaker, and two languages are detected, the electronic device may automatically perform a translation function. Furthermore, when a user executes a predetermined specific motion with the electronic device, the electronic device may automatically execute a translation function. The movement may be detected and identified by comparing a predetermined sensor value and a current sensor value (of, for example, a gyroscopic sensor). The present disclose thus provides a method of recognizing a contextual situations where translation is desired, and automatically performing a translation function, and an electronic device implementing the same.

In accordance with one aspect of the present disclosure, a method of recognizing a situation requiring translation and performing a translation function by an electronic device is provided. The method includes executing a language translation program in response to detecting that an audio signal received via an audio module includes at least a first language and a second language, and translating a portion of the audio signal that is in the second language into the first language and outputting the translated portion through the audio module.

In accordance with another aspect of the present disclosure, electronic device providing a translation function is provided. The device includes an audio module configured to receive and output audio signals, and a processor configured to: execute a language translation program in response to detecting that an audio signal received through the audio module includes at least a first language and a second language, and translate a portion of the audio signal that is in the second language into the first language and outputting the translated portion through the audio module.

In accordance with yet another aspect of the present disclosure, an electronic device for providing a translation function is disclosed, including an audio module configured to receive and output audio signals, a sensor module configured to detect movement of the electronic device, and a processor configured to: in response to receiving a first sensing value from the sensor module indicating that the electronic device has been moved to a vicinity of a user's mouth, receive and translate an audio signal that is in a first language into a second language, and in response to receiving a second sensing value from the sensor module indicating that the electronic device has been moved towards a second user, output the translated audio signal from the audio module.

According to an embodiment of the present disclosure, the method and the apparatus are capable of recognizing a context requiring translation by utilizing the various sensors and the audio codec, and then automatically performing language translation.

BRIEF DESCRIPTION OF THE DRAWINGS

The present disclosure will be more apparent from the following detailed description in conjunction with the accompanying drawings, in which:

FIG. 7C is a diagram illustrating an example transmission of a translation result converted into the text to a terminal of the other user, and the output of the by a terminal of the other user;

DETAILED DESCRIPTION

Figure 1:
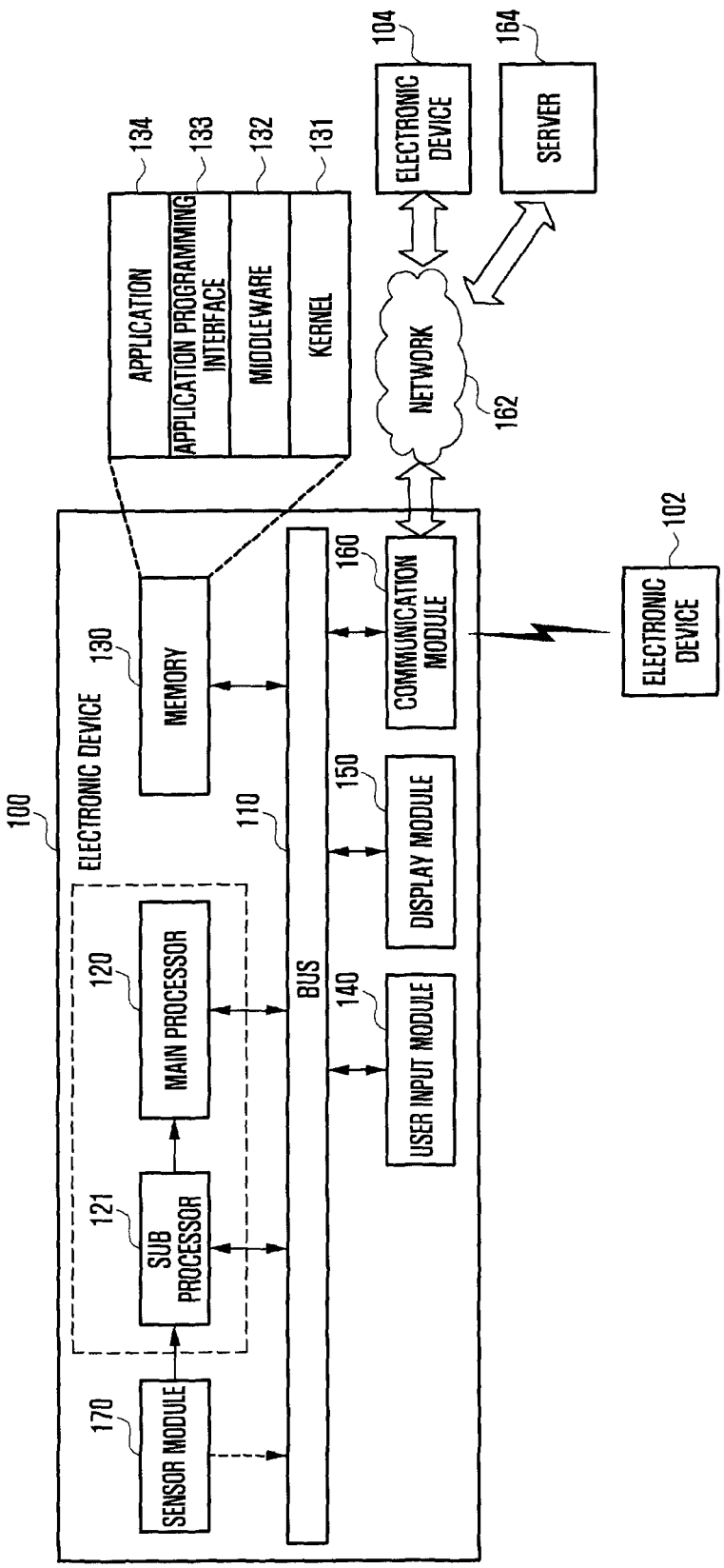
FIG. 1 is a block diagram illustrating an example electronic device according to various example embodiments of the present disclosure.

Hereinafter, various example embodiments will be described in detail with reference to the accompanying drawings. An example embodiment of the present disclosure is exemplified in the drawings and described in a relevant detailed description, but may be variously modified and include various other example embodiments. However, this is not intended to limit the present disclosure to the specific example embodiments, and it will be appreciated that the present disclosure includes all modifications, equivalences, or substitutions included in the ambit of the present disclosure. In describing the drawings, similar elements will be designated by similar reference numerals. Further, in the following description of the present disclosure, a detailed description of known functions and configurations incorporated herein will be omitted when it may make the subject matter of the present disclosure rather unclear. In the description below, parts desirable for understanding operations according to various example embodiments of the present disclosure will be described, and descriptions of other parts may be omitted so as to avoid unnecessarily obscuring the subject matter.

The expressions, "include", "may include", and the like usable in an example embodiment of the present disclosure indicate existence of a disclosed corresponding function, operation, element, and the like, and do not limit additional one or more functions, operations, elements, and the like. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Further, in an example embodiment of the present disclosure, the expressions, "and/or" and the like include any and all of the combinations of numerated words. For example, the expression, "a and/or b", may mean that "a" is included, "b" is included, or both "a" and "b" are included.

Further, in an example embodiment of the present disclosure, the expressions, "a first", "a second", "the first", and "the second" may modify various elements of the present disclosure, but do not limit the corresponding elements. For example, expressions do not limit a sequence and/or importance of corresponding elements. Expressions may be used to discriminate one element from another element. For example, a first user device and a second user device are user devices and indicate devices of different users. For example, a first element could be termed a second element, and similarly, a second element could be also termed a first element without departing from the ambit of the present disclosure.

In the case where a component is referred to as being "connected" or "accessed" to other component, it should be understood that the component may not be directly connected or accessed to the other component, but also there may exist another component between them. Meanwhile, in the case where a component is referred to as being "directly connected" or "directly accessed" to other component, it should be understood that there is no component therebetween. Terms used in the present application are used to describe specific example embodiments, and are not intended to limit the present disclosure. As used herein, the singular forms are intended to include the plural forms as well, unless the context clearly indicates otherwise.

An electronic device according to the present disclosure may be a device including a communication function. For example, the electronic device may be one among various devices, such as a smart phone, a tablet Personal computer (PC), a mobile phone, a video phone, a e-book reader, a desktop PC, a laptop PC, a net book computer, a Personal Digital Assistant (PDA), a Portable multimedia Player (PMP), an MP3 player, a mobile medical device, an electronic bracelet, an electronic necklace, an electronic "appcessory," a camera, a wearable device, an electronic clock, a wrist watch, a home appliance (for example, a refrigerator, an air-conditioner, a vacuum cleaner, an oven, a microwave oven, a washing machine, and an air cleaner), an artificial intelligence robot, a TV, a digital video disk (DVD) player, an audio player, various medical devices (for example, Magnetic Resonance Angiography (MRA), Magnetic Resonance Imaging (MRI), Computed Tomography (CT), a photographing device, and an ultrasonic device), a navigation device, a Global Positioning System (GPS) receiver, an Event Data Recorder (EDR), a Flight Data Recorder (FDR), a set-top box, a TV box (for example, Samsung homeSync™, Apple TV™, or Google TV™), an electronic dictionary, a vehicle infotainment device, electronic equipment for ship (for example, a navigation device for ship and gyrocompass), an air electronic device (avionics), a security device, electronic clothes, an electronic key, a camcorder, a game console, a Head-Mounted Display (HMD), a flat panel display device, an electronic frame, an electronic album, furniture or a part of a building/structure including a communication function, an electronic board, an electronic signature receiving device, and a projector, or a combination of thereof. The electronic device may embed at least one processor capable of performing a language translation function. Further, the electronic device may embed a module capable of outputting a translation result. The electronic device may include a speaker module capable of outputting the result value with a voice and a display module capable of outputting the result value with a text. It is apparent to those skilled in the art that the electronic device according to the present disclosure is not limited to the aforementioned devices.

Hereinafter, example embodiments of the present disclosure will be described in detail with reference to the accompanying drawings.

In describing the example embodiments, technical contents according to an example embodiment of the present disclosure are well known in the technical field, and a description of a technology directly irrelevant to the example embodiment of the present disclosure will be omitted. Moreover, detailed descriptions related to configuration elements having substantially identical configurations and functions will be omitted.

For the same reason, in the accompanying drawings, some configuration elements may be exaggerated, omitted, or schematically shown, and a size of each element may not precisely reflect the actual size. Accordingly, the present disclosure is not limited by a relative size or interval illustrated in the accompanying drawings.

FIG. 1 is a block diagram illustrating an electronic device according to various example embodiments of the present disclosure.

Referring to FIG. 1, an electronic device 100 may include a bus 110, a main processor 120, a sub processor 121, a memory 130, a user input module 140, a display module 150, a communication module 160, or a sensor module 170. The constituent elements of the electronic device according to the example embodiment of the present disclosure illustrated in FIG. 1 are not essential, so that the electronic device may be implemented with more constituent elements or fewer constituent elements. For example, when the electronic device supports a photographing function, the electronic device may further include a configuration of a camera module, and when the electronic device does not support a broadcasting receiving function, some elements (for example, a broadcasting receiving module) of the wireless communication unit may be omitted.

The bus 110 may be a circuit connecting the aforementioned constituent elements to each other and transmitting communication (for example, a control message) between the aforementioned constituent elements.

For example, the main processor 120 may receive instructions from aforementioned other constituent elements (for example, the sub processor 121, the memory 130, the user input module 140, the display module 150, and the communication module 160) through the bus 110, decipher the received instruction, and perform calculation or data processing according to the deciphered instruction.

Further, the sub processor 121 may be formed of a low power processor, and may be formed in one chip with the main processor 120 or in a form of a separate chip. Further, the sub processor 121 may include a buffer or stack type memory therein, and may compare a sensor signal received from the sensor module 170 and pre-stored specific pattern information, and provide a signal for an operation to the main processor 120. Further, the main processor 120 may activate a specific program by a physical key input through the user input module 140.

The memory 130 may store an instruction or data received from the main processor 120 or other constituent elements (for example, the user input module 140, the display module 150, and the communication module 160) or generated by the main processor 120 or other constituent elements. The memory 130 may include programming modules, for example, a kernel 131, a middleware 132, an Application Programming Interface (API) 133, or an application 134. The aforementioned respective programming modules may be formed of software, firmware, or hardware, or a combination of at least two of software, firmware, and hardware.

The kernel 131 may control or manage system resources (for example, the bus 110, the main processor 120, or the memory 130) used for executing an operation or a function implemented in the remaining programming modules, for example, the middleware 132, the API 133, or the application 134. Further, the kernel 131 may provide an interface through which the middleware 132, the API 133, or the application 134 may access and control or manage an individual constituent element of the electronic device 100.

The middleware 132 may serve as an intermediary so that the API 133 or the application 134 may transceive data while communicating with the kernel 131. Further, in relation to work requests received from the plurality of applications 134, the middleware 132 may perform load balancing on the work requests by using, for example, a method of assigning a priority for using the system resource (for example, the bus 110, the main processor 120, or the memory 130) of the electronic device 100 to at least one application among the plurality of applications 134.

The API 133 is an interface, through which the application 134 may control a function provided from the kernel 131 or the middleware 132, and may include at least one interface or function, for example, file control, window control, image processing, or character control.

The user input module 140 may, for example, receive an instruction or data from a user and transmit the received instruction or data to the main processor 120 or the memory 130 through the bus 110. The display module 150 may display an image, a video, or data to the user.

The communication module 160 may connect communication between another electronic device 102 and the electronic device 100. The communication module 160 may support a predetermined near field communication protocol (for example, Wireless Fidelity (WiFi), Bluetooth (BT), Near Field Communication (NFC)) or predetermined network communication 162 (for example, Internet, a Local Area Network (LAN), a Wide Area Network (WAN), a telecommunication network, a cellular network, a satellite network, or a Plain Old Telephone Service (POTS)). Each of the electronic devices 102 and 104 may be the same as (for example, the same type) or different (for example, a different type) from the electronic device 100.

The sensor module 170 may include various sensors, such as a gyro sensor, a gesture sensor, a grip sensor, an acceleration sensor. The sensor module 170 may provide the sub processor 121 with information collected by each of the sensors in the unit of a predetermined time.

Figure 2:
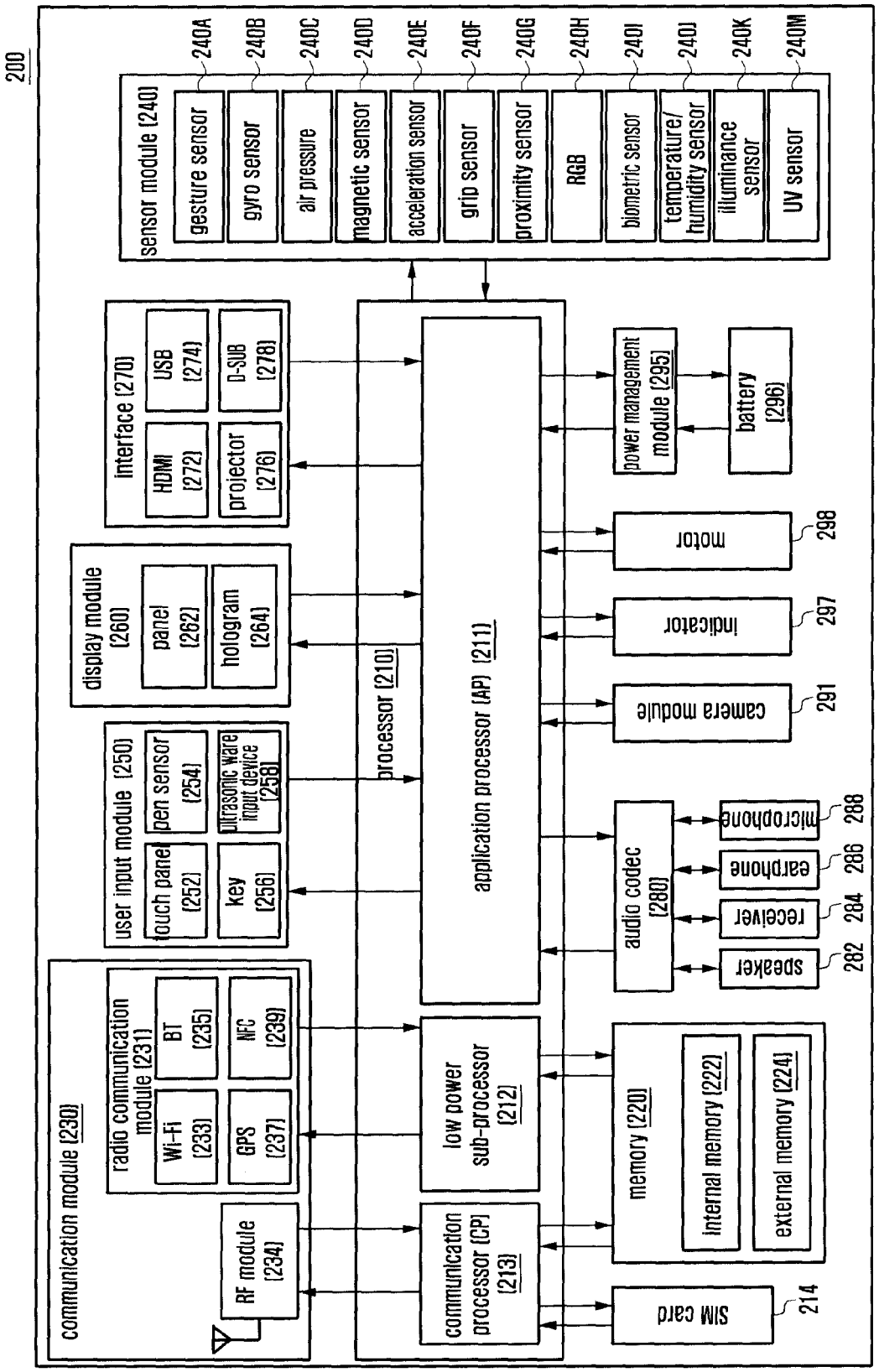
FIG. 2 is a block diagram illustrating example hardware according to various example embodiments of the present disclosure.

FIG. 2 is a block diagram illustrating the hardware according to various example embodiments of the present disclosure.

The hardware 200 may be, for example, the electronic device 100 illustrated in FIG. 1. Referring to FIG. 2, the hardware 200 may include one or more processors 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, or a motor 298.

The processor 210 (for example, the main processor 120) may include one or more Application Processors (AP) 211, one or more Communication Processors (CP) 213, or a low power sub processor 212. The processor 210 may be, for example, the main processor 120 illustrated in FIG. 1. It is illustrated in FIG. 2 that the AP 211, the CP 213, and the low power sub processor 212 are included in the processor 210, but the AP 211, the CP 213, and the low power sub processor 212 may be included in different IC packages, respectively. In one example embodiment, the AP 211, the CP 213, and the low power sub processor 212 may be included in one IC package.

The AP 211 may control a plurality of hardware or software elements connected to the AP 211 by driving an operating system or an application program, and perform processing and calculation on various data including multimedia data. The AP 211 may be implemented as, for example, a System on Chip (SoC). According to one example embodiment, the processor 210 may further include a Graphic Processing Unit (GPU) (not shown).

The CP 213 may perform a function of managing a data link in communication between the electronic device (for example, the electronic device 100) including the hardware 200 and another electronic device connected through the network and converting a communication protocol. The CP 213 may be implemented, for example, a SoC. According to one example embodiment, the CP 213 may perform at least a part of a multimedia control function. The CP 213 may perform discrimination and authentication of a terminal within a communication network by using, for example, a subscriber identification module (for example, the SIM card 214). Further, the CP 213 may provide the user with services, such as voice call, video call, a text message, or packet data.

Further, the CP 213 may control data transception of the communication module 230. It is illustrated in FIG. 2 that the constituent elements, such as the CP 213, the power management module 295, or the memory 220 are separate from the AP 211, but according to one example embodiment, the AP 211 may be implemented so as to include at least a part (for example, the CP 213) of the aforementioned constituent elements.

According to one example embodiment, the AP 211 or the CP 213 may load an instruction or data received from a nonvolatile memory connected to the AP 211 or the CP 213 or at least one of other constituent elements in a volatile memory and process the instruction or the data. Further, the AP 211 or the CP 213 may store data received from at least one of other constituent elements or generated by at least one of other constituent elements in the nonvolatile memory.

Further, the low power sub processor 212 may receive a signal from the sensor module 240 and perform a specific operation without performing a sleep mode even in a case where the AP 211 or the CP 213 of the processor 210 is in the sleep mode. When a signal is received from the sensor module 240, the low power sub processor 212 may determine whether the signal utilizes a predetermined determination, compare the signal with a pattern stored in an internal memory of the low power sub processor 212 or the memory 204 when the determination is desired, and notify the AP 211 of a necessity of driving when it is desirable to drive the AP 211 to make the AP wake up from the sleep mode and perform another operation.

The SIM card 214 may be a card implementing a subscriber identification module, and may be inserted into a slot formed at a specific position of the electronic device. The SIM card 214 may include unique identification information (for example, an Integrated Circuit Card Identifier (ICCID) or International Mobile Subscriber Identity (IMSI)).

The memory 220 may include an internal memory 222 or an external memory 224. The memory 220 may be, for example, the memory 130 illustrated in FIG. 1. The internal memory 222 may include at least one among, for example, a volatile memory (for example, a Dynamic Random Access Memory (DRAM), a Static RAM (SRAM), and a Synchronous DRAM (SDRAM)) and a nonvolatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, and a NOR flash memory). According to one example embodiment, the internal memory 222 may also have a type of a Solid State Drive (SSD). The external memory 224 may further include a flash drive, for example, Compact Flash (CF), Secure Digital (SD), Micro-Secure Digital (Micro-SD), Mini-Secure Digital (mini-SD), extreme Digital (xD), or a memory stick.

The communication module 230 may include a wireless communication module 231 or an RF module 234. The communication module 230 may be, for example, the communication module 160 illustrated in FIG. 1. The wireless communication module 231 may include, for example, the WiFi 233, the BT 235, the GPS 237, or the NFC 239. For example, the wireless communication module 231 may provide a wireless communication function by using a wireless frequency. In addition or in general, the wireless communication module 231 may include a network interface (for example, a LAN card) or a modem for connecting the hardware 200 with a network (for example, the Internet, the Local Area Network (LAN), the Wide Area Network (WAN), the telecommunication network, the cellular network, the satellite network, or the Plain Old Telephone Service (POTS).

The RF module 234 may serve to transceive data, for example, an RF signal or a called electronic signal. Although the RF module 234 is not illustrated, the RF module 234 may include, for example, a transceiver, a Power Amp Module (PAM), a frequency filter, or a Low Noise Amplifier (LNA). Further, the RF module 234 may further include a component, such as a conductor or a conductive line, for transceiving electromagnetic waves in a free space in wireless communication.

The sensor module 240 may include at least one of, for example, a gesture sensor 240A, a gyro sensor 240B, an air pressure sensor 240C, a magnetic sensor 240D, an acceleration sensor 240E, a grip sensor 240F, a proximity sensor 240G, a Red, Green, Blue (RGB) sensor 240H, a biometric sensor 240I, a temperature/humidity sensor 240J, an illuminance sensor 240K, or an Ultra Violet (UV) sensor 240M. The sensor module 240 may measure a physical quantity or detect an operation state of the electronic device, and convert the measured or detected information into an electrical signal. In addition/general, the sensor module 240 may include, for example, an E-nose sensor (not shown), an ElectroMyoGraphy (EMG) sensor (not shown), an Electro-EncephaloGram (EEG) sensor (not shown), an ElectroCardioGram (ECG) sensor (not shown), or a fingerprint sensor. The sensor module 240 may further include a control circuit for controlling one or more sensors included therein.

The user input module 250 may include a touch panel 252, a (digital) pen sensor 254, a key 256, or an ultrasonic wave input device 258. The user input module 250 may be, for example, the user input module 140 illustrated in FIG. 1. The touch panel 252 may recognize a touch input by at least one method of, for example, a capacitive method, a resistive method, an infrared ray method, and an ultrasonic wave method. Further, the touch panel 252 may further include a controller (not shown). In a case of the capacitive method, the touch panel 252 may recognize a proximity touch, as well as a direct touch. The touch panel 252 may further include a tactile layer. In this case, the touch panel 252 may provide the user with a tactile response.

The (digital) pen sensor 254 may be implemented by a method identical or similar to the reception of a touch input of the user or by using a separate sheet for recognition. The key 256 may adopt, for example, a keypad or a touch key. The ultrasonic wave input device 258 is a device capable of detecting sound waves through a microphone (for example, the microphone 288) in a terminal through a pen generating an ultrasonic wave signal and identifying data, and may perform wireless recognition. According to one example embodiment, the hardware 200 may receive a user input from an external device (for example, a network, a computer, or a server) connected with the communication module 230 through the communication module 230.

The display module 260 may include a panel 262 or a hologram 264. The display module 260 may be, for example, the display module 150 illustrated in FIG. 1. The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be formed in one module with the touch panel 252. The hologram 264 may show a 3D image in the air by using interference of light. According to one example embodiment, the display module 260 may further include a control circuit for controlling the panel 262 or the hologram 264.

The interface 270 may include, for example, a High Definition Multimedia Interface (HDMI) 272, a Universal Serial Bus (USB) 274, a projector 276, or a D-subminiature (D-sub) 278. In addition or in general, the interface 270 may include, for example, Secure Digital_(SD)_/_Card (MMC) (not shown) or Infrared Data Association (IrDA) (not shown).

The audio codec 280 may bilaterally convert a voice and an electrical signal. The audio codec 280 may convert voice information input or output through, for example, a speaker 282, a receiver 284, an earphone 286, or a microphone 288. According to the example embodiment of the present disclosure, the processor 210 may confirm that the number of languages is two or more based on voice information about a first user using a first language preset by the user and a second user using a second language. When the number of languages received from the audio codec is two or more, the processor 210 may execute a language translation program and application, and translate the second language to the first language to output the translated first language. Further, when the number of languages received from the audio codec is three or more, the processor 210 may set the second language according to a specific condition (for example, a language having a largest ratio within a predetermined time) by using an audio module.

The camera module 291 is a device capable of photographing an image and a video, and according to one example embodiment, may include one or more image sensors (for example, a front lens or a rear lens), an Image Signal Processor (ISP) (not shown), or a flash LED (not shown).

The power management module 295 may manage power of the hardware 200. Although it is not illustrated, the power management module 295 may include, for example, a Power Management Integrated Circuit (PMIC), a charger Integrated Circuit (IC), or a battery fuel gauge.

The PMIC may be mounted within, for example, an integrated circuit or a SoC semiconductor. A charging manner may be divided into a wired manner or a wireless manner. The charger IC may charge the battery, and prevent an inflow of overvoltage or overcurrent from a charger. According to one example embodiment, the charger IC may include a charger IC for at least one of a wired charging manner or a wireless charging manner. The wireless charging manner may include, for example, a magnetic resonance manner, a magnetic induction manner, or an electromagnetic wave manner, and may additionally include an additional circuit for wireless charging, for example, a coil loop, a resonant circuit, and a rectifier.

The battery fuel gauge may measure, for example, a residual quantity, a voltage during charging, a current, or a temperature of the battery 296. The battery 296 may generate electricity and supply a power source, and may be, for example, a rechargeable battery.

The indicator 297 may display a specific state, for example, a booting state, a message state, or a charging state, of the hardware 200 or a part of the hardware 200 (for example, the AP 211). The motor 298 may convert an electrical signal into a mechanical vibration. The MCU 299 may control the sensor module 240.

Although it is not illustrated, the hardware 200 may include a processing device (for example, the GPU) for supporting a mobile TV. The processing device for supporting the mobile TV may process media data according to a standard of, for example, Digital Multimedia Broadcasting (DMB), Digital Video Broadcasting (DVB), or multimedia flow. In the example embodiment according to the present disclosure, each of the aforementioned constituent elements of the hardware may be formed of one or more components, and a name of a corresponding constituent element may be changed according to the kind of electronic device. In the example embodiment according to the present disclosure, the hardware may be formed of at least one among the aforementioned constituent elements, and some constituent elements may be omitted or other additional constituent elements may be included in the hardware. Further, in the example embodiment according to the present disclosure, some of the constituent elements of the hardware are combined to form one entity, so that the functions of the corresponding constituent elements before the combination may be equally performed.

A term "module" used in the example embodiment according to the present disclosure may mean, for example, a unit including one or a combination of two or more of hardware, software, and firmware. The "module" may be interchangeably used with a term, such as a unit, logic, a logical block, a component, or a circuit. The "module" may be a minimum unit or a part of an integrally formed component. The "module" may be a minimum unit performing one or more functions or a part thereof. The "module" may be mechanically or electronically implemented. For example, in the example embodiment according to the present disclosure, the "module" may include at least one of an already known or to-be-developed Application Specific integrated Circuit (ASIC) chip, Field Programmable Gate Arrays (FPGAs), or a programmable logic device performing certain operations.

Figure 3:
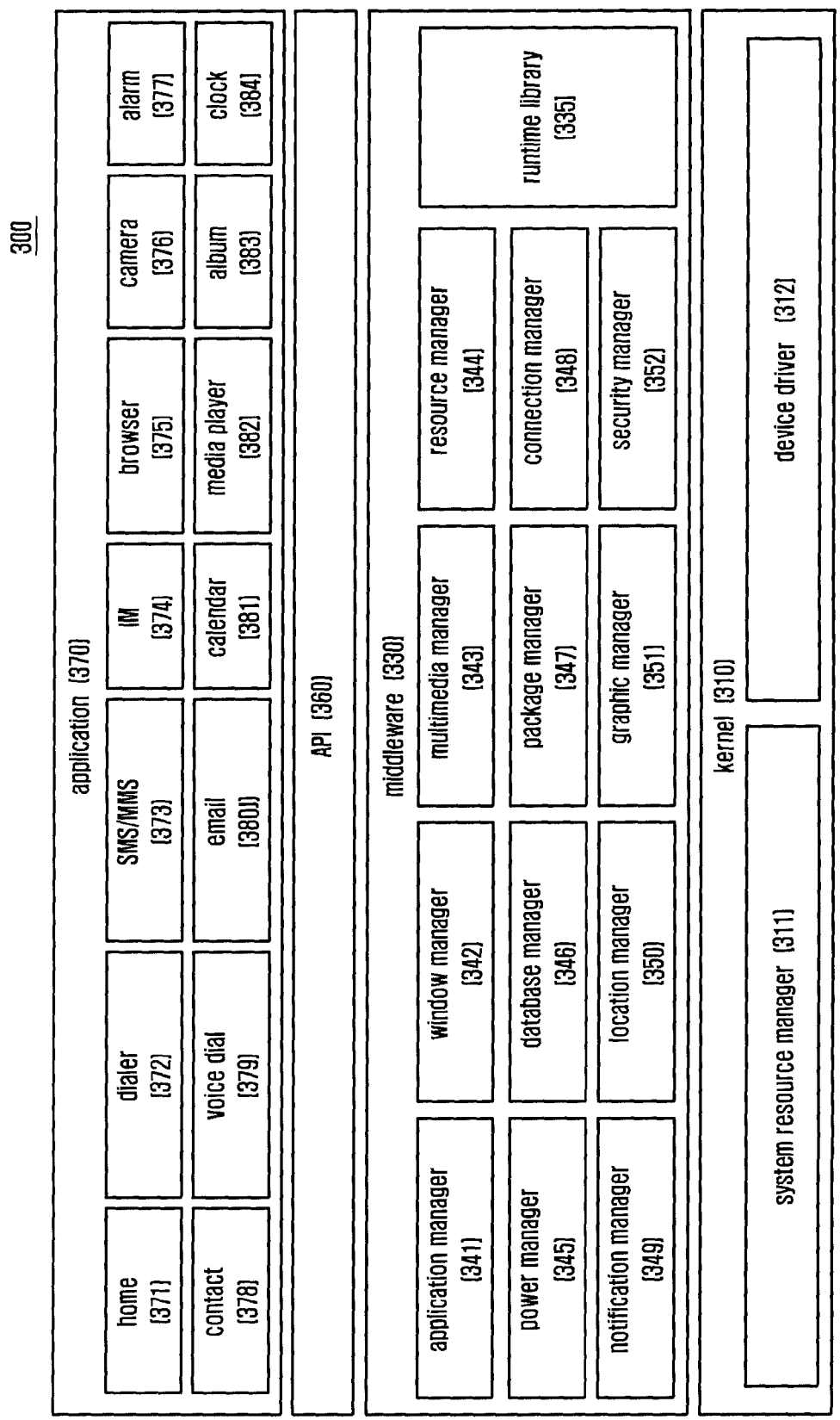
FIG. 3 is a block diagram illustrating an example programming module according to an example embodiment of the present disclosure.

FIG. 3 is a block diagram illustrating a programming module 300 according to one example embodiment.

The programming module 300 may be included (for example, stored) in the electronic device 100 (for example, the memory 130) illustrated in FIG. 1. At least a part of the programming module 300 may be formed of software, firmware, or hardware, or a combination of two or more of software, firmware, and hardware. The programming module 300 may include an Operating System (OS) implemented in the hardware (for example, the hardware 200) to control a resource related to the electronic device (for example, the electronic device 100) or various applications (for example, an application 370) driven on the operating system. For example, the OS may be Android, iOS, Windows, Symbian, Tizen, or Bada. Referring to FIG. 3, the programming module 300 may include a kernel 310, middleware 330, an Application Programming Interface (API) 360, or the application 370.

The kernel 310 (for example, the kernel 131) may include a system resource manager 311 or a device driver 312. The system resource manager 311 may include, for example, a process manager, a memory manager, or a file system manager. The system resource manager 311 may perform control, allocation, or collection of a system resource. The device driver 312 may include, for example, a display driver, a camera driver, a Bluetooth driver, a shared memory driver, a USB driver, a keypad driver, a WiFi driver, or an audio driver. Further, according to one example embodiment, the device driver 312 may include an Inter-Process communication (IPC) driver (not shown).

The middleware 330 may include a plurality of modules pre-implemented in order to provide a function commonly utilized by the application 370. Further, the middleware 330 may provide a function through the API 360 so as for the application 370 to efficiently use a limited system resource inside the electronic device. For example, as illustrated in FIG. 3, the middleware 330 (for example, the middleware 132) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The run time library 335 may include, for example, a library module used by a compiler in order to add a new function through a programming language during the execution of the application 370. According to one example embodiment, the run time library 335 may perform a function for input/output, memory management, or a calculation function.

The application manager 341 may manage, for example, a life cycle of at least one application in the application 370. The window manager 342 may manage a GUI resource used in a screen. The multimedia manager 343 may recognize a format desirable for reproducing various media files, and perform encoding or decoding of a media file by using a codec appropriate to a corresponding format. The resource manager 344 may manage a resource, such as a source code, a memory, or a storage space, of at least one application in the application 370.

The power manager 345 may be operated together with a Basic Input/Output System (BIOS) and the like to manage a battery or a power, and provide power information desirable for the operation. The database manager 346 may manage the database so as to generate, search, or change a database to be used in at least one application in the application 370. The package manager 347 may manage installation or update of an application distributed in a form of a package file.

The connectivity manager 348 may manage wireless connection, such as WiFi or Bluetooth. The notification manager 349 may display or notify an event, such as an arrival message, an appointment, or proximity notification, to the user in a non-disturbed manner. The location manager 350 may manage location information about the electronic device. The graphic manager 351 may manage a graphic effect to be provided to the user or a user interface related to the graphic effect. The security manager 352 may provide a general security function desirable for system security or user authentication. According to one example embodiment, in a case where the electronic device (for example, the electronic device 100) includes a call function, the middleware 330 may further include a telephony manager (not shown) for managing a voice or video call function of the electronic device.

The middleware 330 may generate a new middleware module through a combination of various functions of the aforementioned internal constituent element modules and use the generated new middleware module. The middleware 330 may provide a module specialized for each type of the OS in order to provide a differentiated function. Further, some of existing constituent elements may be dynamically deleted or new constituent elements may be added to the middleware 330. Accordingly, some of the constituent elements described in the example embodiment of the present disclosure may be omitted, other constituent elements may be further included, or the constituent element may be substituted with a constituent element performing a similar function but having a different name.

The API 360 (for example, the API 133) is a set of API programming functions, and may be provided with different configurations according to the OS. For example, in a case of the Android or iOS, one API set may be provided for each platform, and in a case of the Tizen, two or more API sets may be provided.

The application 370 (for example, the application 134) may include, for example, a preloaded application or the third party application.

At least a part of the programming module 300 may be implemented by an instruction stored in a computer readable storage media. In a case where the instruction is executed by one or more processors (for example, the processor 210), the one or more processors may perform a function corresponding to the instruction. The computer readable storage media may be, for example, the memory 220. At least a part of the programming module 300 may be implemented (for example, executed) by, for example, the processor 210. At least a part of the programming module 300 may include, for example, a module, a program, a routine, a set of instructions, and/or a process for performing one or more functions.

In the example embodiment of the present disclosure, names of the constituent elements of the programming module (for example, the programming module 300) may be changed according to the type of OS. In the example embodiment of the present disclosure, the programming module may include at least one of the aforementioned constituent elements, some of the aforementioned constituent elements may be omitted, or the programming module may further include other additional constituent elements. In the example embodiment of the present disclosure, the programming module or operations performed by other constituent elements may be processed by a sequential, parallel, repeated, or heuristic method, and further, some operations may be omitted or another operation may be added.

Figure 4A:
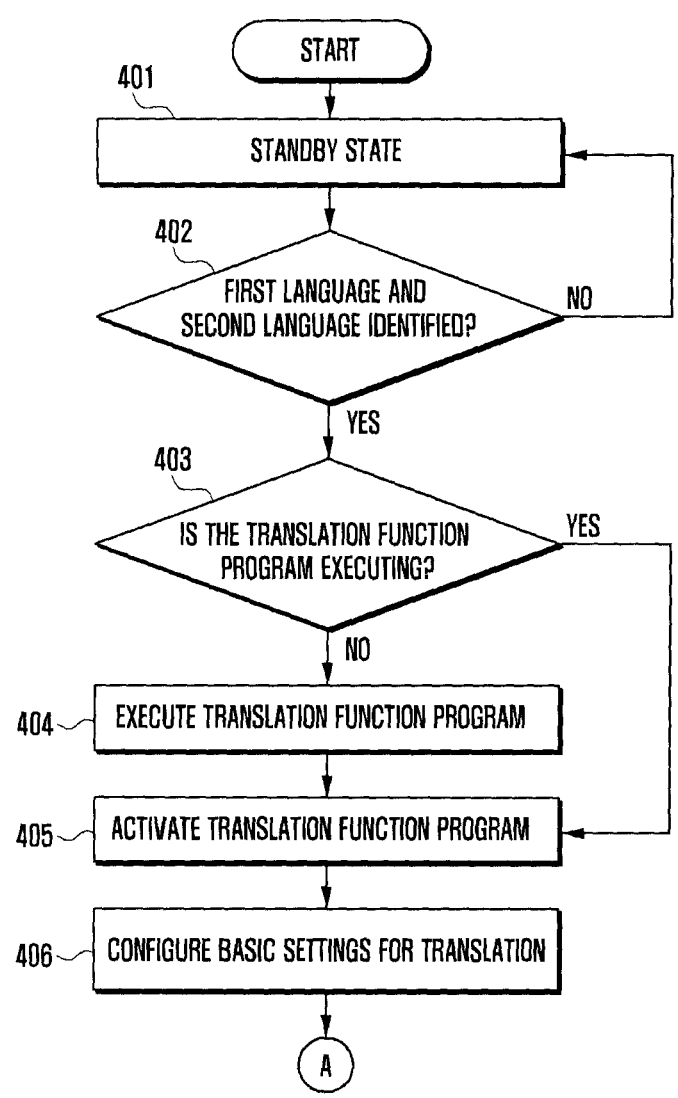
FIG. 4A and FIG. 4B are flowcharts illustrating an example operation of recognizing a situation involving translation through a voice and executing a translation function by the electronic device according to an example embodiment of the present disclosure.
Figure 4B:
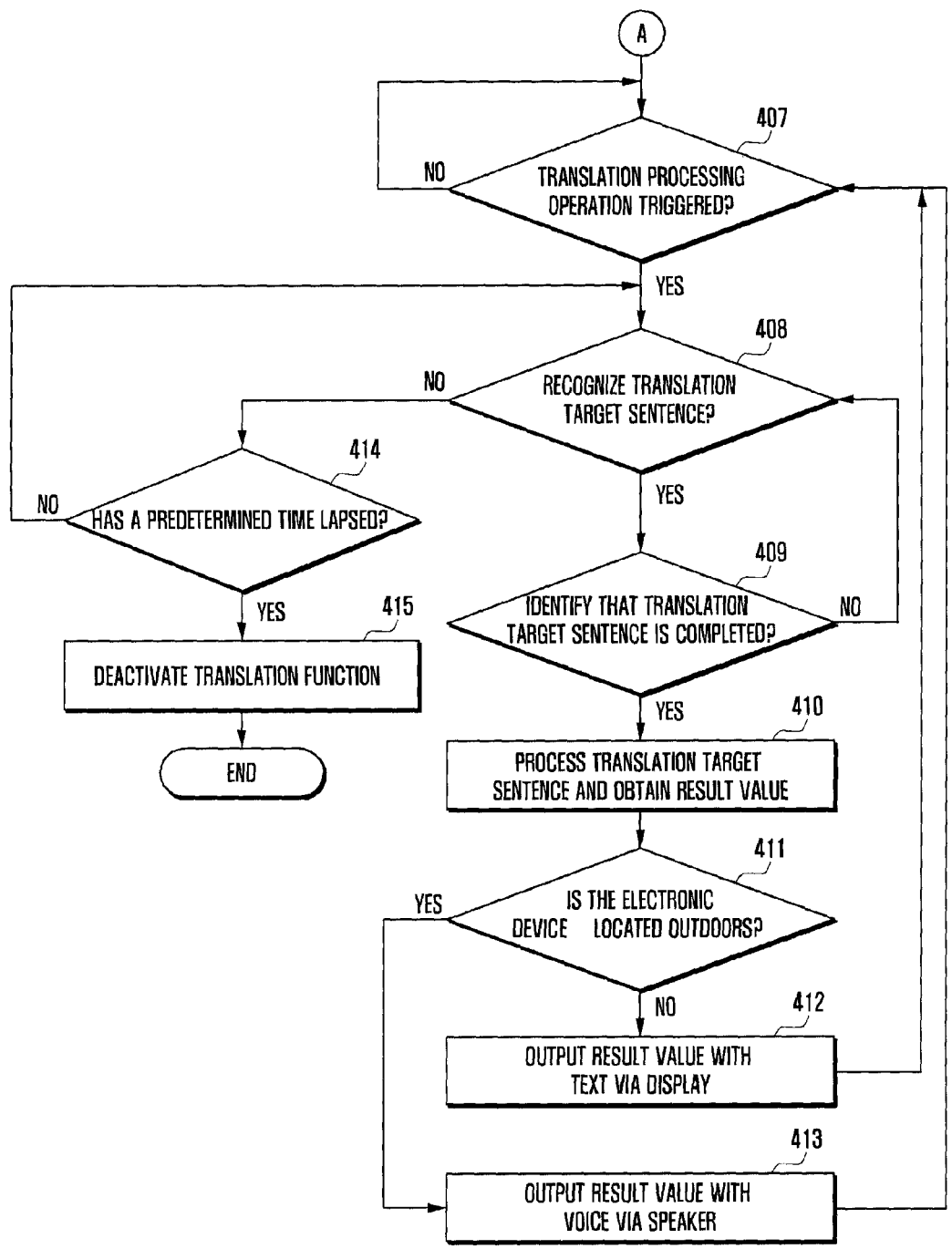

FIGS. 4A and 4B are flowcharts illustrating an example operation of recognizing a situation involving translation through a voice and executing a translation function by the electronic device according to an example embodiment of the present disclosure. The flowcharts of FIGS. 4A and 4B will be described with reference to FIG. 2. However, it is apparent to those skilled in the art that the flowcharts of FIGS. 4A and 4B may be equally understood even when the flowcharts of FIGS. 4A and 4B are described by using the configurations of FIG. 1 or FIG. 3.

Referring to FIG. 4A, in operation 401 the processor 210 may maintain a standby state, awaiting signals from the user input module 250, the audio codec 280, the communication module 230, and the sensor module 240 to initiate a language translation function. The signal may be generated when the user input module 250 may detects a physical key input by the user, when the audio codec 280 receives voice inputs of two users, converts the inputs into an electrical signal and transmits the information to the processor 210, or when the sensor module 240 measures values received from the respective sensors, and transmits the measured sensing values to the processor 210. After the standby state is existed, the processor 210 may receive audio input from the audio codec 280 corresponding to a conversation between at least two users using a first language and a second language.

In operation 402, after the standby state is exited, the processor 210 may determine whether the first language and the second language are identified in a received audio signal. The processor 210 may be configured to translate the second language into the first language. Here, the first language may be preset by the user, if, for example, the user uses the first language often. Further, the processor 210 may also set a language occupying the largest ratio among languages for a predetermined time (i.e., a commonly used language) as the second language. Further, the user may arbitrarily set the second language (i.e., manual selection). When the processor 210 determines that the first language and the second language have not been identified in operation 402, the processor 210 returns to the standby state.

In operation 403, when the processor 210 determines that the first language and the second language have been detected in operation 402, the processor 210 identifies an execution state of a translation function program (such as, for example, a language translation program). That is, in a case where the number of languages received from the audio codec 280 is two or more, the processor 210 may identify the execution state of the language translation program. Here, the translation function program is a program that performs translation, and thus may be an application (e.g., 134 from FIG. 1) stored in the memory 220.

In operation 405, when the translation function program executing (including execution states occurring in the "background"), the processor 210 may activate the translation function program to bring it to the foreground. In operation 404, when the translation function program is not in the execution state in operation 403, the processor 210 may execute the translation function program. Subsequently, the processor 210 may activate the translation function program, as depicted in operation 405. Accordingly, the translation function program may be executed or activated in response to detection of identification of at least two languages in the received audio signal.

In operation 406, the processor 210 may configure basic settings for translating the language, setting the first language and the second language to indicate translation of the second language into the first language. Here, the user may designate the first language and the second language. For example, the processor 210 may set a language pre-configured by the user to be the first language (for example, Korean), and set another language received from the audio codec as the second language (for example, English), configuring the processor 210 to translate the second language (Korean) into the first language (English). Further, when a plurality of languages, except for the first language, are detected by the audio codec 280, the processor 210 may set a language occupying the largest ratio for a predetermined time (i.e., the most commonly heard language within a set time limit) among the detected languages to be the second language. Further, the user may arbitrarily set a language to be the second language to indicate desired translation of the second language into the first language.

Referring now to FIG. 4B, after configuring the basic settings, in operation 407, the processor 210 may execute a trigger operation for translation-processing. The processor 210 repeatedly performs operation 407 until the trigger operation for the translation-processing is completed in operation 407.

In operation 408, after the trigger operation is completed, the processor 210 may recognize a translation target sentence. The processor 210 may continuously recognize a translation target sentence in operation 408 until the translation target sentence is completed in operation 409. In operation 409, if the translation target sentence is excessively long or speech is continued without discontinuation in operation 409, the processor 210 may directly translation-process the translation target sentence when a predetermined time elapses from a time at which the processor 210 recognizes the translation target sentence. Here, the predetermined time may be a pre-defined time in the program.

In operation 410, when the processor 210 identifies that the translation target sentence is completed in operation 409, the processor 210 may translation-process the translation target sentence and obtain a result value of the translation in operation 410.

In operation 411, the processor 210 may identify a location of the electronic device 100 by using the communication module 230 and the sensor module 240 in operation 411. For example, the processor may identify whether the location of the electronic device is outdoors by using a satellite GPS of the communication module 230 or through location information through the communication module 230 and an Access Point (AP) inside a building.

In operation 412, if it is identified that the electronic device is not located outdoors in operation 411, the processor may output a result value in a form of a text through the display module in operation 412. After outputting the result value in the form of the text, the processor 210 re-performs the trigger operation for the translation-processing that is operation 407.

In operation 413, if it is identified that the electronic device 100 is located outdoors in operation 411, the processor 210 may output a result value with a voice through the speaker 282 in operation 413. After outputting the result value with the voice, the processor 210 re-performs the trigger operation for the translation-processing that is operation 407.

In operation 408, after completion of the trigger operation that is operation 407, if the processor 210 does not recognize a translation target sentence in operation 408, then in operation 414, the processor 210 may identify whether a predetermined time has elapsed from the time at which the processor 210 recognizes the translation target sentence. The processor 210 may continuously recognize the translation target sentence until the predetermined time elapses in operation 414. When the predetermined time elapses in operation 414, the processor 210 may deactivate the translation program and terminate the translation process in operation 415.

Figure 5A:
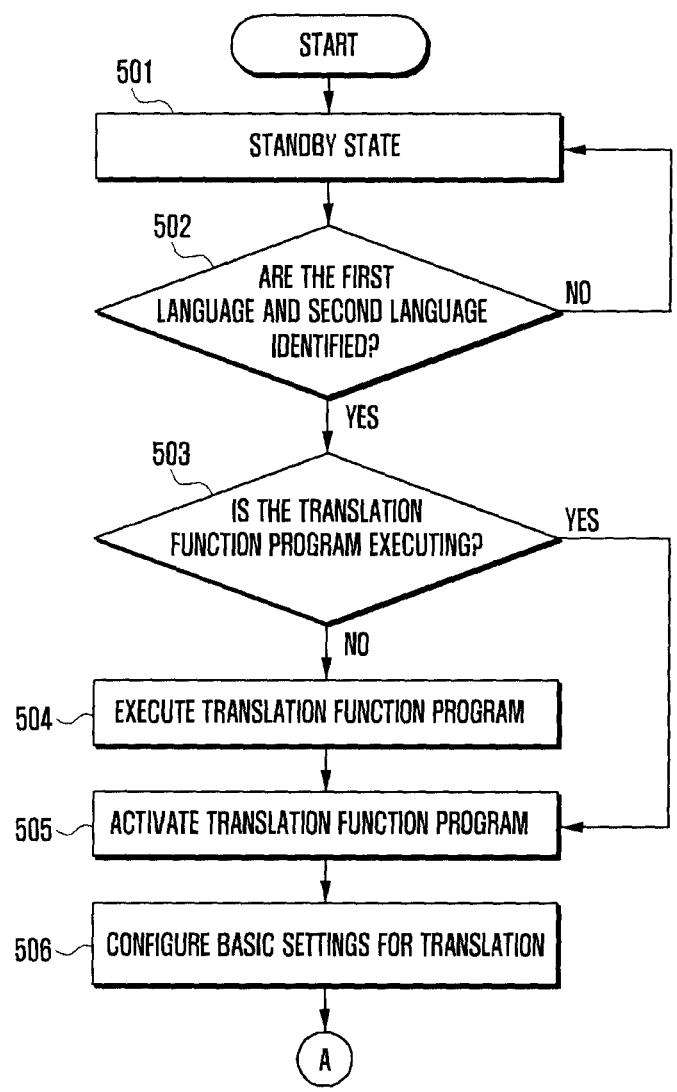
FIG. 5A and FIG. 5B are flowcharts illustrating an example operation of recognizing a situation involving translation through a voice, executing a translation function, and then transmitting information to a terminal of the other user by the electronic device according to an example embodiment of the present disclosure.
Figure 5B:
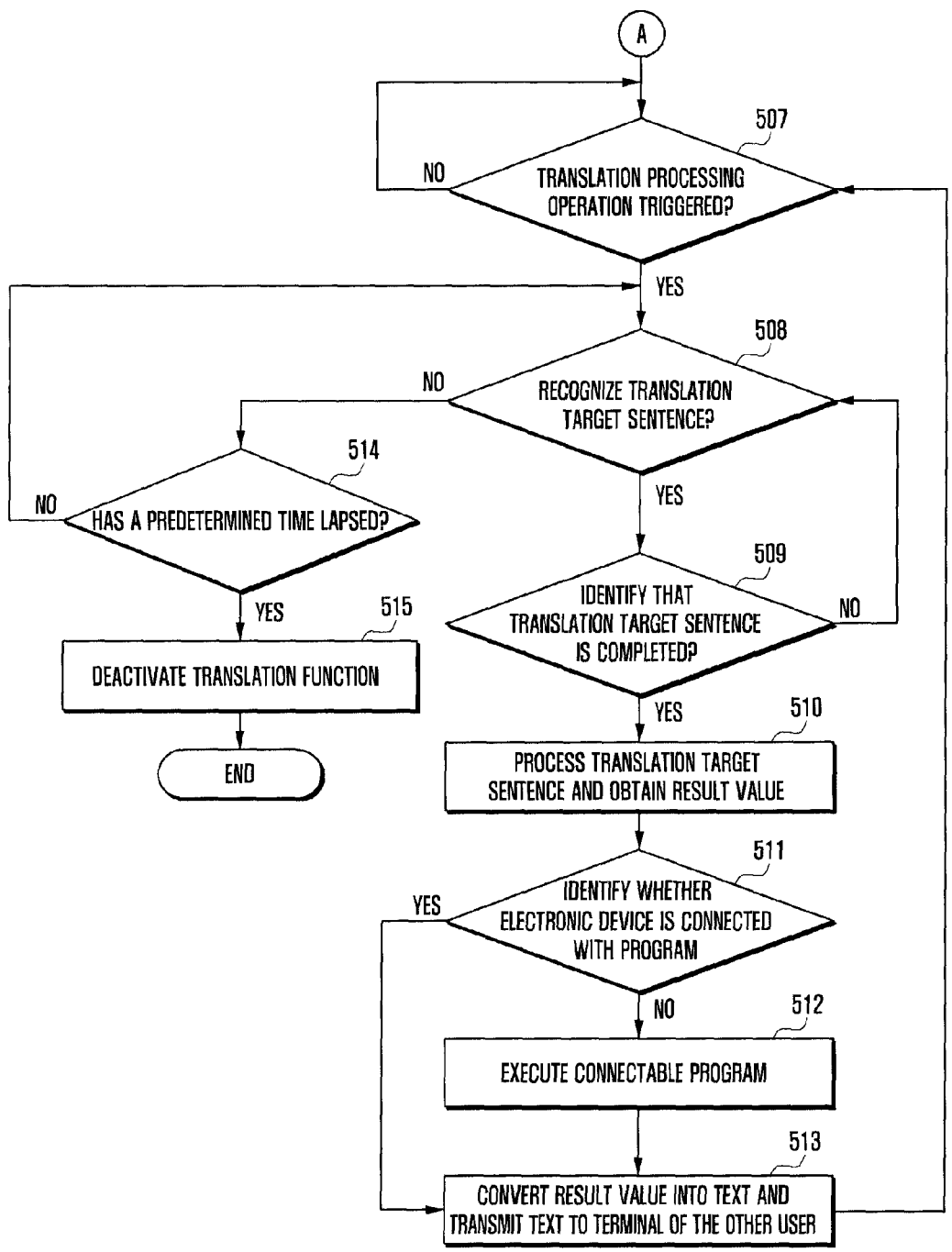

FIGS. 5A and 5B are flowcharts illustrating an example operation of recognizing a situation involving translation through a voice, executing a translation function, and then transmitting information to a terminal of the other user by the electronic device according to an example embodiment of the present disclosure.

Referring to FIG. 5A, the processor 210 may maintain a standby state in operation 501. Here, the standby state may refer to a preparatory state before the processor 210 receives a signal. After receiving a relevant signal initiating the translation operation, then in operation 502, the processor 210 may detect at least two spoken languages through the audio codec 280, and identify the first language and the second language. The processor 210 may be configured to translate the second language into the first language. Here, the first language may be a language pre-set by the user. Further, the user may also set as the second language a language occupying the largest ratio for language detection values measured for a predetermined time (i.e., a most frequently utilized language). Alternatively, the user may arbitrarily set the second language (via, for example, manual configuration). If the processor 210 fails to identify detection of the first language and the second language in operation 502, the processor 210 returns to the standby state.

In operation 503, if the processor 210 successfully identifies the first and second language, then the processor 210 may identify an execution state of a translation function program.

In cases where the translation function program is executing (including states where it is executing in the background), then in operation 505, the processor 210 may activate the translation function program, bringing it, for example, to the foreground.

In cases where the translation function program is not executing, then in operation 504, the processor 210 may execute the translation function program, and then activate the translation function program in operation 505, as above.

In operation 506, the processor 210 may configure basic settings for translating the language. The processor 210 may set the first language and the second language. Here, the user may input the settings of the first language and the second language. For example, the user may manually pre-set a language as the first language, and another language as the second language, configuring the processor 210 to translate the second language into the first language. In another case, where a plurality of languages is detected by the audio codec 280, the processor 210 may set a language occupying the largest ratio for a predetermined time (i.e., a most commonly heard language within a set amount of time) as the second language. Further, the user may set a language arbitrarily (i.e. manually) as the second language, configuring the processor 210 to translate the second language into the first language. As described above, the processor 210 may configure the setting of the first language and the second language by various methods.

Referring to FIG. 5B in operation 507, after configuring the basic settings for translation, the processor 210 may execute a trigger operation for translation-processing. The processor 210 repeatedly performs operation 507 until the trigger operation for the translation-processing is completed in operation 507.

In operation 508, when the trigger operation is completed, the processor 210 may recognize a translation target sentence. The processor 210 may continuously recognize a translation target sentence in operation 508 until, in operation 509 the translation target sentence is completed.

In operation 509, if the translation target sentence is excessively long or speech continues without discontinuation, the processor 210 may directly translation-process the translation target sentence when a predetermined time elapses from a time at which the processor 210 recognized the start of the target sentence. Here, the predetermined time may be a pre-defined time in the program.

If the processor 210 identifies that the translation target sentence is completed in operation 509, then in operation 510, the processor 210 may translation-process the translation target sentence and obtain a result value of the translation.

In operation 511, the processor 210 may identify whether the electronic device 100 is connected with a terminal of the other user. Here, the connection between the electronic device 100 and the terminal of the other user means a state in which data may be transmitted/received, such as connection of the program or connection through the communication module 230.

If it is determined that the electronic device 100 is connected with the terminal of the other user, then in operation 513, the processor 210 may convert the result value into a text and transmit the text to the terminal of the other user in operation 513.

If it is determined that the electronic device 100 is not connected with the terminal of the other user, then in operation 512, the processor 210 may execute a program connectable for transceiving data between the electronic device 100 and the terminal of the other user. The connectable program may be the application (134 of FIG. 1) stored in the memory 220. After executing the program, the processor may convert the obtained result value into the text and transmit the text to the terminal of the other user in operation 513. The terminal of the other user may output the received information with the text.

After transmitting the result value, the processor 210 may re-perform the trigger operation for the translation-processing that is operation 507. After performing the trigger operation that is operation 507, the processor 210 may fail to recognize the translation target sentence in operation 508, in which case the processor 210 may identify whether a predetermined time has elapsed from the time at which the processor 210 recognized the translation target sentence in operation 514. The processor 210 may continuously recognize the translation target sentence until the predetermined time elapses in operation 514.

When the predetermined time elapses in operation 514, the processor 210 may deactivate the translation program and terminate a translation process in operation 515.

Figure 6:
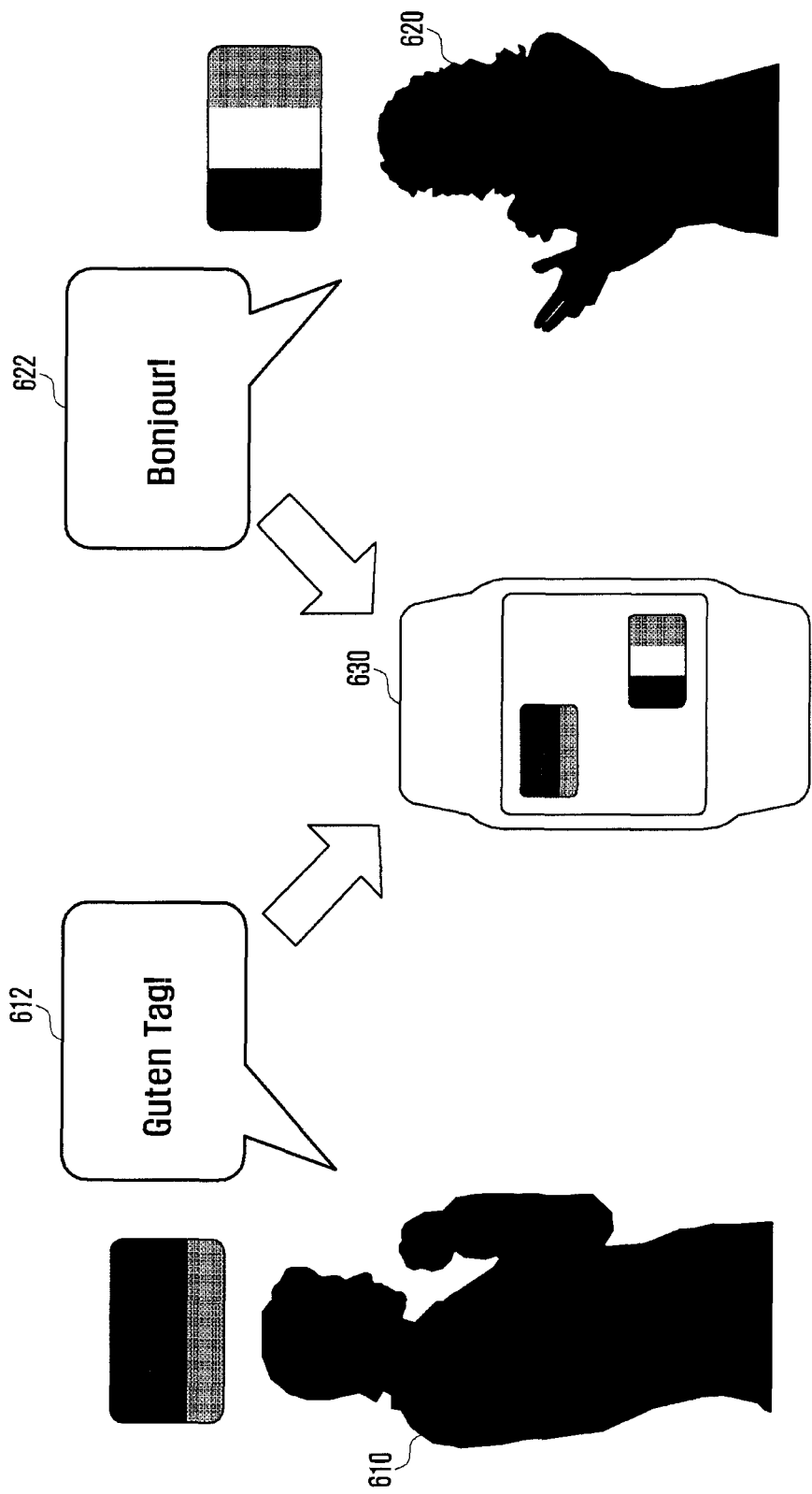
FIG. 6 is a diagram illustrating an example operation of detecting a first language and a second language, recognizing a situation involving translation, and executing a translation function by the electronic device according to an example embodiment of the present disclosure.

FIG. 6 is a diagram illustrating an example operation of detecting a first language and a second language, recognizing a situation involving translation, and executing a translation function by the electronic device according to an example embodiment of the present disclosure.

FIG. 6 illustrates a situation in which a user 610 and the other user 620 communicate with different languages. An electronic device 630 may detect two languages being used in communication between the user 610 and the other user 620. Thus, the electronic device 630 may also detect two or more languages. The electronic device 630 may detect a voice via the audio codec 280 and convert the detected voice into an electrical signal. The converted electrical signal may be transmitted to the application processor 211, and the processor 210 may detect two or more languages based on the electrical signal received through the audio codec 280.

Thus, when the processor 210 detects two or more languages, the processor 210 may automatically execute a language translation function, program or application. The processor 210 may set a first language and a second language based on the detected languages. For example, the processor 210 may utilize a language pre-set by the user for the first language, and set another language received from the audio codec as the second language, thereby resulting in a configuration capable of translating the second language into the first language. Further, in a case where a plurality of languages is detected by the audio codec 280, the processor 210 may set a language occupying the largest ratio for a predetermined time as the second language. Further, the user may set a language arbitrarily set by the user as the second language, and translate the second language into the first language. For example, when the electronic device 630 detects the German language, which is the language of the user 610, and French, which is the language of the other user 620, the processor 210 of the electronic device 630 may actively execute the translation function program to perform translation-processing. In this case, the setting of the first language and the second language may be variously set according to the aforementioned methodology.

Figure 7A:
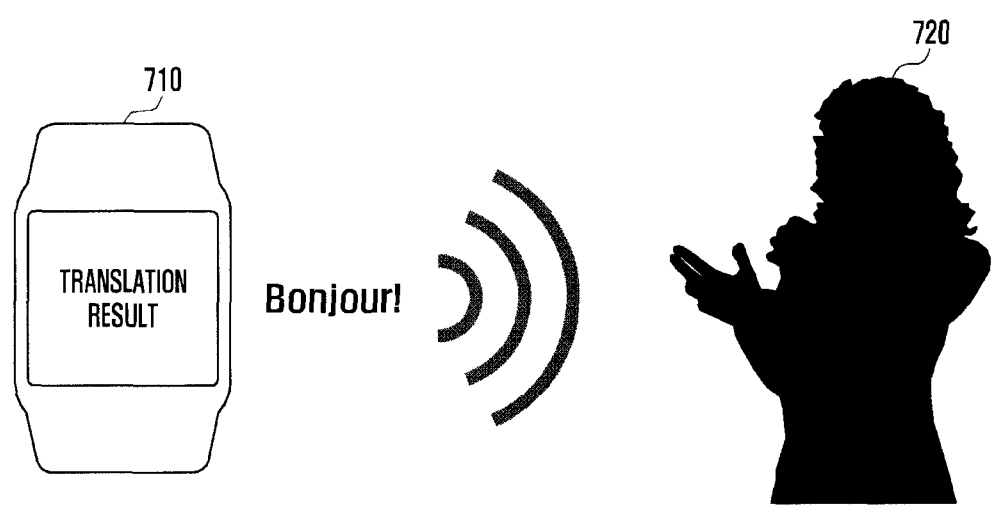
FIG. 7A is a diagram illustrating an example operation converting a translation result into a voice and outputting the voice through a speaker according to an example embodiment of the present disclosure.

FIG. 7A is a diagram illustrating an example operation converting a translation result into a voice and outputting the voice through a speaker according to an example embodiment of the present disclosure.

A user may be communicating with the other user outdoors. The processor 210 may identify a location of an electronic device 710 by using the communication module 230 and the sensor module 240. For example, the electronic device 710 may use the GPS 237 of the communication module 230. Further, although not illustrated, the processor 210 may identify a location of the electronic device 710 by using an Access Point (AP) inside a building. Further, when the sensor module 240 is used (the sensor module 240 being, for example, the temperature/humidity sensor 240J, the illuminance sensor 240K, and the UV sensor 240M), the accuracy of the identification of the location of the electronic device 710 by the processor 210 may be improved. As described above, when the processor 210 identifies that the location of the electronic device 710 is outdoors, the processor 210 converts a result value of the translation into an audible voice output and outputs the voice through the speaker 282.

Figure 7B:
FIG. 7B is a diagram illustrating an example operation converting a translation result into a text and outputs the text through a display according to an example embodiment of the present disclosure.

FIG. 7B is a diagram illustrating an example operation converting a translation result into a text and outputs the text through a display according to an example embodiment of the present disclosure. When the processor 210 identifies that the location of the electronic device 710 is indoors, the processor 210 may convert a result value of the translation into a text and output the text through the display module 260 of the electronic device 710. The user may identify the result value of the translation by the text through the display module 260.

FIG. 7C is a diagram illustrating an example transmission of a translation result converted into the text to a terminal of the other user, and the output of the by a terminal of the other user. The processor 210 may convert a result value of the translation into a text and transmit the text to an electronic device of the other user. The electronic device may be, for example, a terminal 722 and a watch 724 equipped with a module capable of outputting the result value of the translation with a voice and/or text. The other user 720 may identify the result value in the form of the text through their electronic device. Further, when the electronic device includes a module capable of outputting another format, the electronic device may output the result value in a format desired by the other user 720. A method connecting the electronic device 710 and the electronic device of the other user may maintain the connection state in which data may be transmitted/received between devices, via, for example, a program operating through the communication module 230. For example, when the electronic device 710 is coupled with the electronic device of the other user, and both users are utilizing the same application, the translation function may be performed via the respective communication modules of the devices and each instance of the application.

Figure 8A:
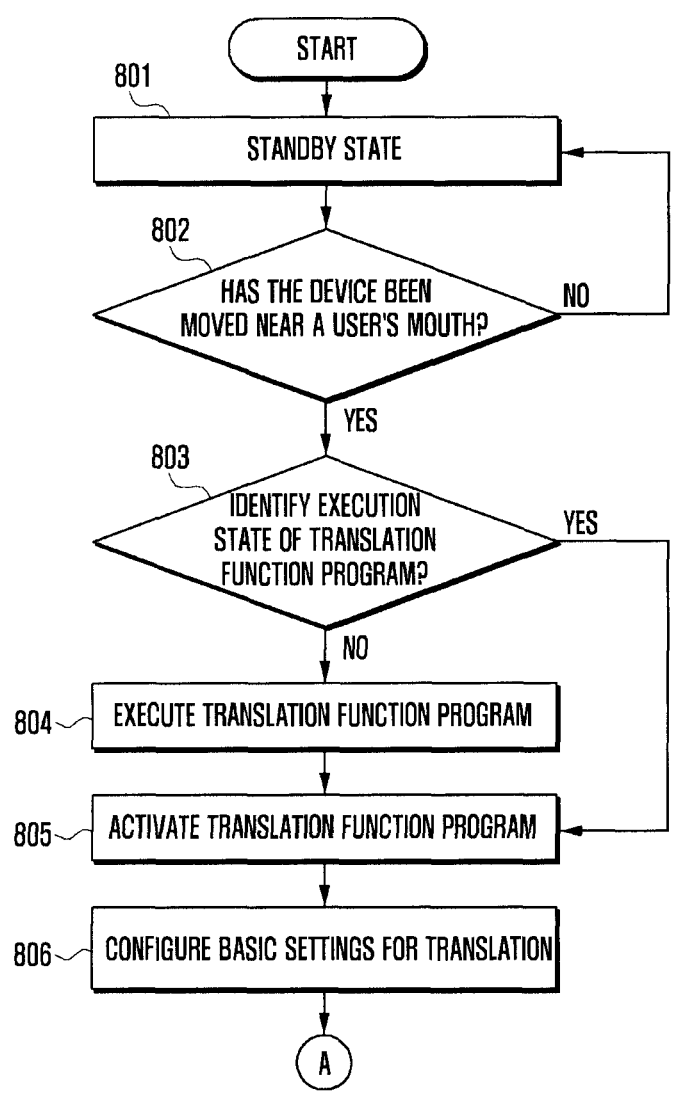
FIG. 8A and FIG. 8B are flowcharts illustrating an example operation recognizing a motion of a user and executing a translation function according to an example embodiment of the present disclosure.
Figure 8B:
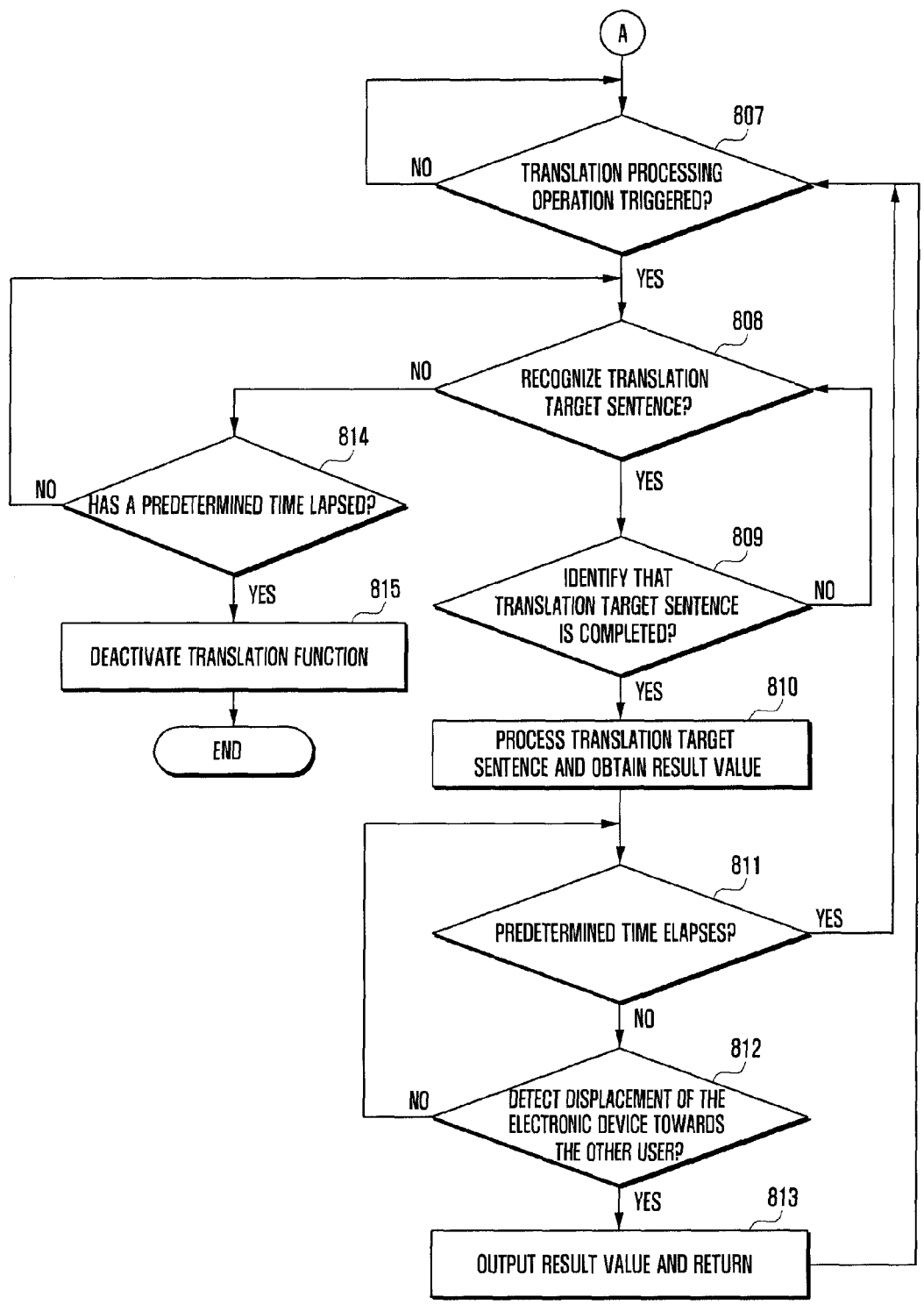

FIGS. 8A and 8B are flowcharts illustrating an example operation recognizing a motion of a user and executing a translation function according to an example embodiment of the present disclosure. The processor 210 may maintain a standby state in operation 801. Here, the standby state means a state before receiving a signal from the user input module 250, the audio codec 280, the communication module 230, and the sensor module 240.

In operation 802, the standby state may be interrupted by the generation of a signal. The signal may be generated by a variety of means or a combination of means. For example, the processor 210 may recognize a motion of a user through the sensor module 240 in operation 802. The electronic device 100 may recognize the motion of the user and the processor 210 may execute a program according to the corresponding motion. The processor 210 may identify a sensing value for a motion of moving the electronic device 100 to the vicinity of the mouth by the user in operation 802. Here, the motion of moving the electronic device 100 to the vicinity of the mouth may be defined as a first motion. Further, a sensing value for a motion of the user may be pre-stored in the memory 220 by using the sensor module 240 (for example, the gesture sensor, the gyro sensor, the acceleration sensor, the temperature/humidity sensor, and the illuminance sensor). The processor 210 may identify the motion of the user by comparing the sensing value pre-stored in the memory 220 and the sensing value received from the sensor module. Accordingly, the processor 210 may also execute a set program.

When the processor 210 fails to detect the first motion where the electronic device 100 is moved to the vicinity of the mouth in operation 802, the processor 210 may continuously maintain the standby state.

When the processor 210 identifies the motion moving the electronic device 100 to the vicinity of the mouth, then in operation 803, the processor 210 may identify an execution state of the translation function program.

In operation 805, if the translation function program is executing in operation 803, the processor 210 may activate the executing translation function program.

In operation 804, if the translation function program is not executing in operation 803, the processor 210 may execute the translation function program in operation 804 and activate the translation function program in operation 805.

After the translation function program is activated in operation 805, then in operation 806, the processor 210 may configure basic settings for translation-processing in operation 806. The processor 210 may set the first language and the second language, thus being configured to translate the first language into the second language or the second language into the first language. Here, the first language and the second language may be set by various methods by the user. For example, the processor 210 may set a language pre-set by the user in the electronic device 100 as the first language, and set another language detected by the audio codec 280 as the second language. Further, the user may set arbitrarily determined languages as the first language and the second language and translate the language.

After the processor 210 configures basic settings in operation 806, then in operation 807, the processor 210 may perform a trigger operation for the translation-processing. The processor 210 repeatedly performs operation 807 until the trigger operation for the translation-processing is completed.

In operation 808, when the trigger operation is completed, the processor 210 may recognize a translation target sentence through the audio codec 280. The processor 210 may continuously and repeatedly perform operation 808 and operation 809 until the processor 210 recognizes the translation target sentence in operation 808.

In operation 809, if the processor 210 identifies that the translation target sentence is completed, then in operation 810, the processor 210 may translate the translation target sentence and obtain a result value of the translation.

After obtaining the result value in operation 810, then in operation 811, the processor 210 may identify whether a predetermined time elapses from a time at which the result value is obtained.

In operation 812, if the predetermined time does not elapse in operation 811, the processor 210 may identify a sensing value for a motion of making the electronic device 100 head toward the other user by using the sensor module 240. That is, the processor 210 may identify a movement of the electronic device 100 by comparing the sensing value pre-stored in the memory 220 and the sensing value received from the sensor module 240. For example, the movement of the electronic device 100 may be displacing towards the other user. Here, the displacement of the electronic device 100 head towards the other user may be defined as a second motion. In operation 812, the processor 210 may identify whether displacement of the electronic device 100 head towards the other user is sensed before lapse of the predetermined time of operation 811.

If the processor 210 determines that the predetermined time lapsed in operation 811, the processor 210 may re-execute the trigger operation for the translation-processing of operation 807.

If the processor 210 displacement of the electronic device 100 towards the other user in operation 812, then in operation 813, the processor 210 may output a result value, and return to the trigger operation for the translation-processing of operation 807.

If the processor 210 sets a sensing value in connection with a specific motion in operation 812, the processor 210 may also output a result value for a corresponding operation. That is, the processor 210 may also variously set a condition under which a result value is output. Further, the processor 210 may determine the location of the electronic device 100 as indoors or outdoors in operation 813 and change an output method. Further, the processor 210 may change the output method according to various conditions, as well as the determination of the location of the electronic device 100 as indoors or outdoors. After the processor 210 performs the trigger operation for the translation-processing in operation 807, the processor 210 may recognize the translation target sentence in operation 808.

In operation 814, if the predetermined time lapses and the processor 210 has failed to recognize the translation target sentence (as in operation 808), then in operation 815, the processor 210 may deactivate the translation function program. If the processor 210 deactivates the translation function program in operation 815, the processor 210 may terminate the translation operation.

Figure 9:
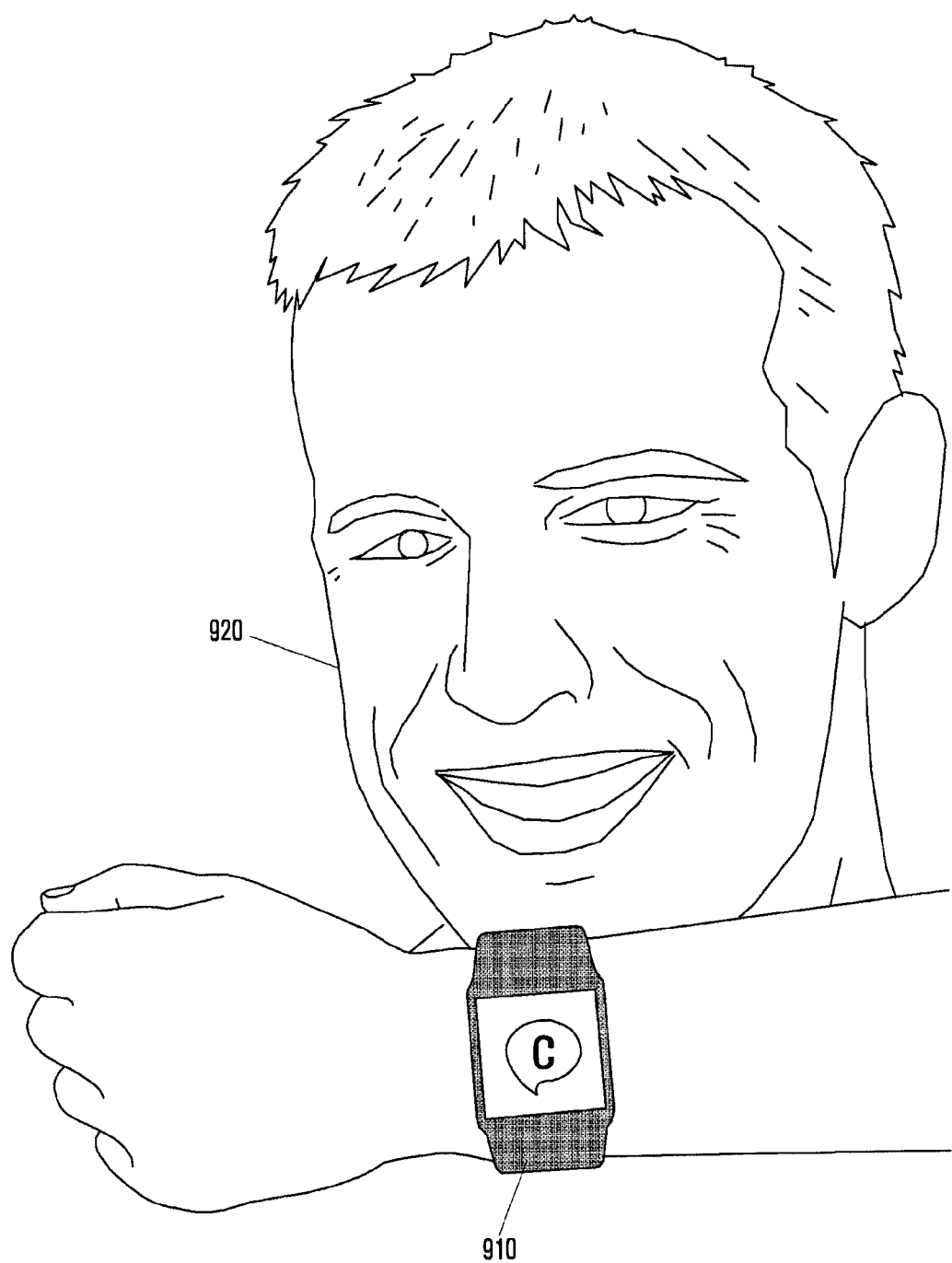
FIG. 9 is a diagram of an example illustrating an example operation recognizing a motion of a user and executing a translation function by the electronic device according to an example embodiment of the present disclosure.

FIG. 9 is a diagram of an example illustrating an example operation recognizing a motion of a user and executing a translation function by the electronic device according to an example embodiment of the present disclosure. An electronic device 910 may detect a motion of a user 920 through the sensor module 240. The processor 210 of the electronic device 910 may identify the motion of the user by comparing the sensing value pre-stored in the memory 220 and a sensing value received from the sensor module 240. The processor 210 may identify the motion of the user based on two sensing values, and execute the translation function program when the electronic device 910 identifies that the motion of the user is a specific motion.

For example, the processor 210 may detect a specific motion of displacement of the electronic device 910 to the vicinity of the mouth of the user 920 through the sensor module 240 (including, for example, the gesture sensor, the gyro sensor, the acceleration sensor, the temperature/humidity sensor, and the illuminance sensor). Here, the processor 210 may define the motion of moving the electronic device 910 to the vicinity of the mouth of the user 920 as a first motion.

The processor 210 may also execute the program based on the motion of the user 920 by various methods through the comparison of the sensing values. The processor 210 of the electronic device 910 may receive a language of the user 920 from the audio codec 280 and translate the received language.

Further, the processor 210 of the electronic device 910 may identify a second motion of the electronic device 910 based on the aforementioned two sensing values. Here, the second motion of the electronic device 910 may be displacement of the electronic device towards the other user. When the processor 210 of the electronic device 910 identifies the second motion of the electronic device 910, the processor 210 may output a result of the translation-processing.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

The terms "unit" or "module" or "codec" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

What is claimed is:

1. An electronic device, comprising:
   a memory configured to store a language translation program;
   an audio module configured to receive and output audio signals; and
   a processor operatively coupled to the memory, configured to:
      receive an audio signal via the audio module,
      detect whether the received audio signal includes at least a first language and a second language,
      in response to detecting that the received audio signal does not include at least both the first language and the second language, return to a standby state of the electronic device, and
      in response to detecting that the received audio signal includes at least both the first language and the second language:
         execute the language translation program stored in the memory,
         translate by the executed language translation program a portion of the audio signal that is in the second language into the first language, and
         audibly output at least the translated portion of the audio signal via the audio module.

2. The electronic device of claim 1, wherein the processor is further configured to:
   set a language configuration indicating the first language and the second language.

3. The electronic device of claim 2, wherein the processor is further configured to:
   set a language used for a majority of a length of the audio signal as the second language.

4. The electronic device of claim 1, further comprising a display, wherein the processor further configured to:
   convert the translated portion of the audio signal to a text string and display the text string on the display.

5. The electronic device of claim 4, further comprising a sensor module configured to detect at least one environmental condition of the electronic device, wherein the processor further configured to:
   detect via the sensor module the at least one environmental condition, wherein:
   in response to the environmental condition indicating that the electronic device is indoors, display the text string on the display, and
   in response to the environmental condition indicating that the electronic device is outdoors, audibly output the translated first portion through the audio module.

6. The electronic device of claim 1, further comprising a communication module configured to communicatively couple with at least one other electronic device, wherein the processor further configured to:
   transmit, via the communication module, the translated portion of the audio signal to the other electronic device for output of the translated portion via the other electronic device.

7. The electronic device of claim 1, wherein the processor is further configured to:
   receive via the audio module a translation target sentence;
   set a predetermined time starting from reception of the translation target sentence;
   in response to detecting an end of the received translation target sentence before expiry of the predetermined time, translate the ended translation target sentence; and
   in response to continuously detecting reception of the translation target sentence after expiry of the predetermined time, directly translate the translation target sentence.

8. The electronic device of claim 1, the processor further configured to:
   detect whether the language translation program is executing when the received audio signal includes at least the first language and the second language.

9. An electronic device, comprising:
   an audio module configured to receive and output audio signals;
   a memory configured to store a first pre-stored sensing value indicating movement of the electronic device to a first position, and a second pre-stored sensing value indicating movement of the electronic device to a second position;
   a sensor module configured to detect movement of the electronic device; and
   a processor operatively coupled to memory, configured to:
      in response to receiving a first sensing value from the sensor module matching the first pre-stored sensing value, receive and translate an audio signal corresponding to a first language into a second language, and
      in response to receiving a second sensing value from the sensor module matching the second pre-stored sensing value, output the translated audio signal through the audio module.

10. The electronic device of claim 9, the processor further configured to:
set a language used for a majority of a length of the audio signal as the first language.

11. The electronic device of claim 9, wherein the electronic device comprises a smartwatch and the second pre-stored sensing value comprises sensor values indicating displacement of the smartwatch away from a first user wearing the smartwatch towards a second user.

12. A method of real-time translation in an electronic device, comprising:
receiving an audio signal via an audio module;
detecting by at least one processor whether the received audio signal includes at least a first language and a second language;
in response to detecting that the received audio signal does not include at least both the first language and the second language, returning to a standby state of the electronic device; and
in response to detecting that the received audio signal includes at least both the first language and the second language:
executing, by at least one processor, a language translation program stored in a memory;
translating, by at least one processor, a portion of the audio signal corresponding to the second language into the first language; and
audibly outputting at least the translated portion of the received audio signal through the audio module.

13. The method of claim 12, further comprising:
setting a language configuration indicating the first language and the second language.

14. The method of claim 13, further comprising:
setting a language used for a majority of a length of the audio signal as the second language.

15. The method of claim 12, further comprising:
converting the translated portion of the audio signal to a text string and display the text string on a display of the electronic device.

16. The method of claim 15, further comprising:
detecting via a sensor module of the electronic device at least one environmental condition, wherein:
in response to the environmental condition indicating that the electronic device is indoors, display the text string on the display, and
in response to the environmental condition indicating that the electronic device is outdoors, audibly output the translated first portion through the audio module.

17. The method of claim 12, further comprising:
transmit the translated portion of the audio signal to another electronic device via a communication module of the electronic device communicatively coupled to the another electronic device,
wherein the another electronic device is configured to output the translated portion.

18. The method of claim 12, further comprising:
receiving via the audio module a translation target sentence;
setting a predetermined time starting from reception of the translation target sentence:
in response to detecting an end of the received translation target sentence before expiry of the predetermined time, translating the ended translation target sentence; and
in response to continuously detecting reception of the translation target sentence after expiry of the predetermined time, directly translating the translation target sentence.

19. The method of claim 12, further comprising:
detecting whether the language translation program is executing when the received audio signal includes at least the first language and the second language.

* * * * *